(12) United States Patent
Watanabe

(10) Patent No.: US 8,537,239 B2
(45) Date of Patent: Sep. 17, 2013

(54) IMAGE PROCESSING METHOD, IMAGE PROCESSING APPARATUS AND IMAGE PROCESSING PROGRAM

(75) Inventor: Takeshi Watanabe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 193 days.

(21) Appl. No.: 13/212,622

(22) Filed: Aug. 18, 2011

(65) Prior Publication Data

US 2012/0050583 A1 Mar. 1, 2012

(30) Foreign Application Priority Data

Aug. 27, 2010 (JP) ................................ 2010-191000
Aug. 5, 2011 (JP) ................................ 2011-172363

(51) Int. Cl.
*H04N 5/225* (2006.01)
*G06K 9/36* (2006.01)

(52) U.S. Cl.
USPC ...................................... 348/222.1; 382/260

(58) Field of Classification Search
USPC ........ 382/254, 255, 260, 276, 280; 348/222.1
See application file for complete search history.

(56) References Cited

U.S. PATENT DOCUMENTS

| | | | |
|---|---|---|---|
| 6,822,758 B1 | 11/2004 | Morino | |
| 8,049,798 B2 | 11/2011 | Hayashi | |
| 2008/0007797 A1* | 1/2008 | Hayashi et al. | 358/474 |
| 2008/0043126 A1* | 2/2008 | Hayashi | 348/294 |
| 2008/0080019 A1* | 4/2008 | Hayashi et al. | 358/474 |
| 2009/0322928 A1* | 12/2009 | Robinson et al. | 348/340 |
| 2010/0013966 A1* | 1/2010 | Feng et al. | 348/273 |
| 2011/0187874 A1* | 8/2011 | Kikuchi | 348/207.1 |
| 2011/0285879 A1* | 11/2011 | Hatakeyama | 348/241 |
| 2011/0292257 A1* | 12/2011 | Hatakeyama | 348/242 |

FOREIGN PATENT DOCUMENTS

| | | |
|---|---|---|
| JP | 2000-020691 A | 1/2000 |
| JP | 2002-085389 A | 3/2002 |
| JP | 2006-238032 A | 9/2006 |
| JP | 2009-124568 A | 6/2009 |
| WO | 2007074649 A1 | 7/2007 |

OTHER PUBLICATIONS

Japanese Office Action drafted Oct. 7, 2011 for corresponding JP 2011-172363. Partial English Translation provided.
JP Office Action drafted Oct. 7, 2011 for corresponding JP 2011-172363 (Partial Translation provided).

* cited by examiner

*Primary Examiner* — Jason Whipkey
(74) *Attorney, Agent, or Firm* — Rossi Kimms & McDowell LLP

(57) ABSTRACT

The image processing apparatus includes an image inputting part configured to acquire a captured image produced by an image pickup system including an optical system and an image sensor, a filter producing part configured to produce an image restoration filter, and a restoration processing part configured to perform an image restoration process on the captured image by using the image restoration filter to produce a restored image. The filter producing part is configured to set amplification factors for respective frequency components in the image restoration filter according to a frequency characteristic of an alias signal that may be generated in the image sensor.

8 Claims, 12 Drawing Sheets

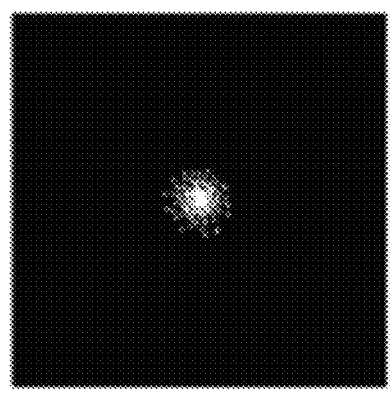
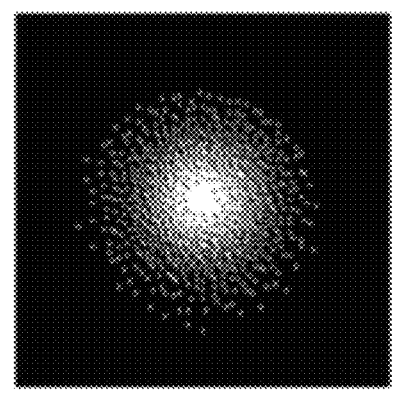
FIG. 5A  FIG. 5B
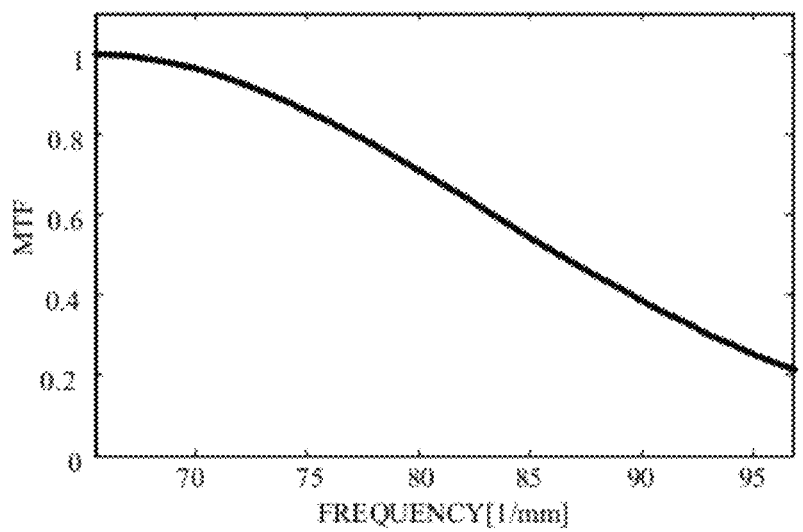
FIG. 6A
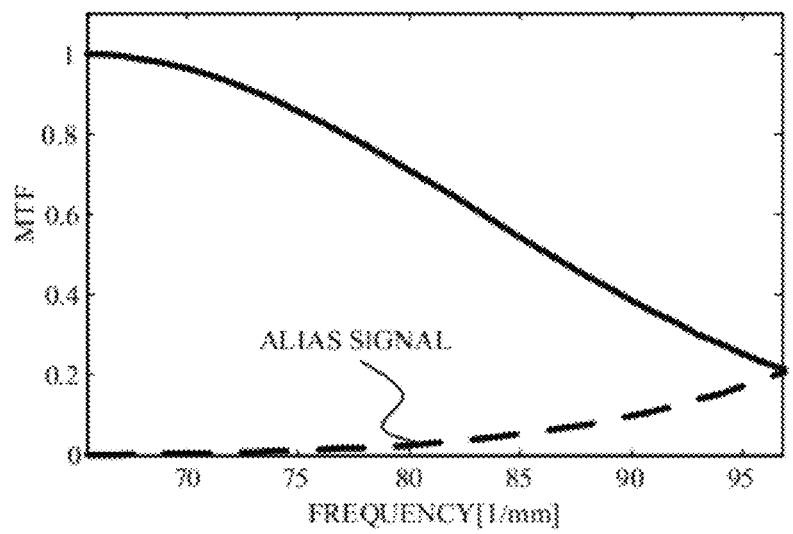
FIG. 6B

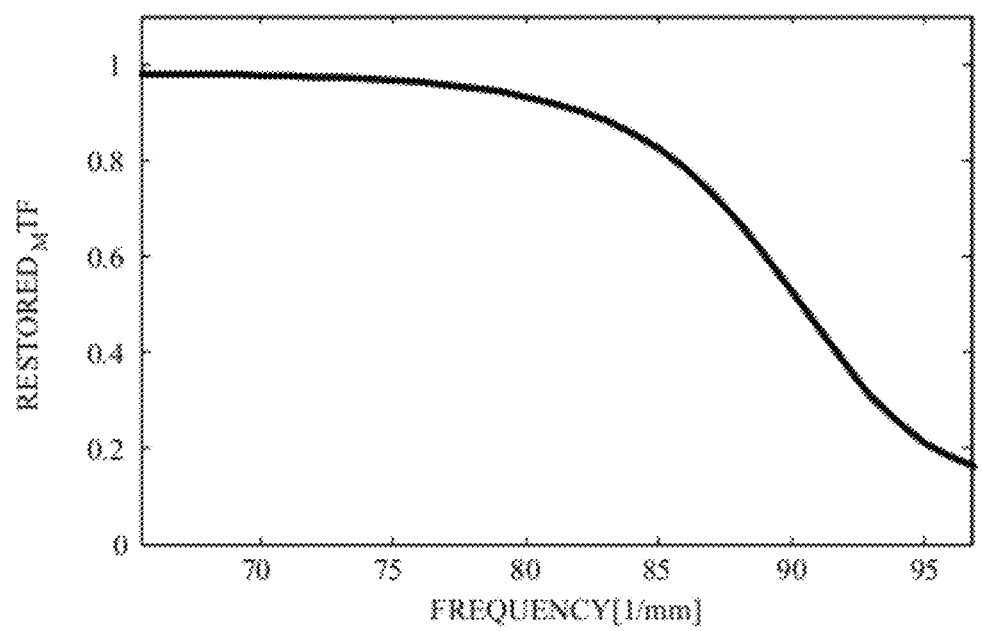
FIG. 17
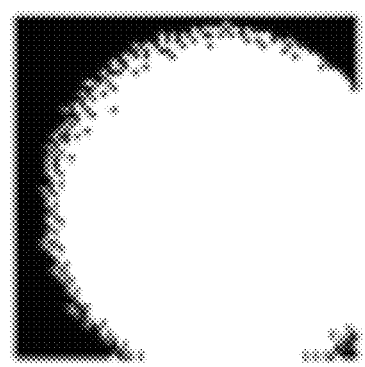 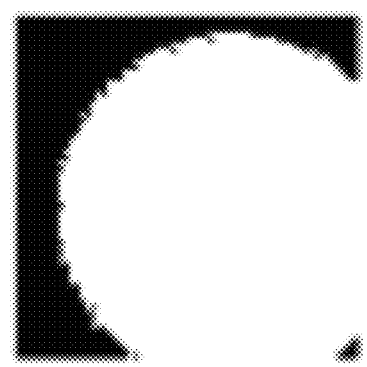
FIG. 18A  FIG. 18B

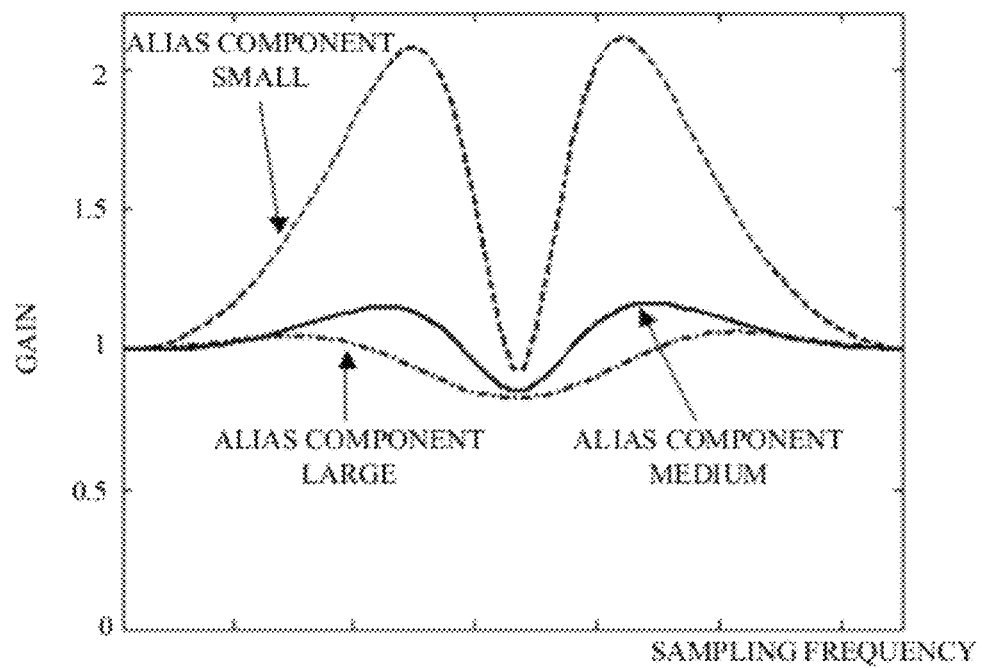
FIG. 21
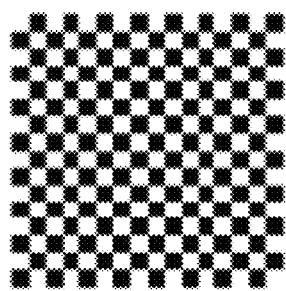 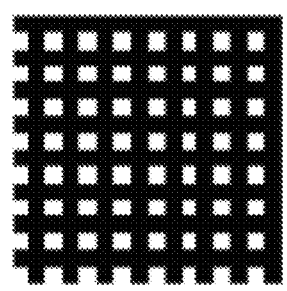 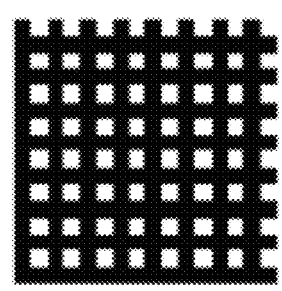
FIG. 22A  FIG. 22B  FIG. 22C

IMAGE PROCESSING METHOD, IMAGE PROCESSING APPARATUS AND IMAGE PROCESSING PROGRAM

BACKGROUND OF THE INVENTION

1. Field of the Invention

The present invention relates to an image processing technique for restoring an image deteriorated due to an influence of an optical system to produce a high-resolution image.

2. Description of the Related Art

In image capturing of an object through an optical system, light emitted from one point of the object may spatially spread without converging to one point on an image plane, due to influences of diffraction caused by the optical system and aberration of the optical system. Such spread is expressed by a PSF (Point Spread Function). And, in the image acquired by the image capturing (by using an image sensor), an image blur component is generated by convolving a spread component expressed by the PSF to an object area, which causes deterioration of image resolution.

As a method of correcting such image deterioration due to the optical system by using an image processing technique (image restoration process), the following method is proposed.

When, in a real space (x,y), f(x,y) represents a non-deteriorated image, the PSF represents h(x,y), g(x,y) represents a deteriorated image and "*" represents convolution, the following expression is established:

$$g(x,y) = \iint f(X,Y) * h(x-X, y-Y) dX dY \qquad (1).$$

When performing Fourier transform on the expression (1) to transform it from the real space (x,y) to a frequency space (u,v), the following expression is obtained:

$$G(u,v) = F(u,v) \times H(u,v) \qquad (2)$$

where F(u,v) represents a result of the Fourier transform of f(x,y), G(u,v) represents a result of the Fourier transform of g(x,y), and H(u,v) represents a result of the Fourier transform of h(x,y).

Therefore, the following expression is obtained:

$$F(u,v) = G(u,v) / H(u,v) \qquad (3).$$

As understood from the expression (3), dividing G(u,v) that is the result of the Fourier transform of the deteriorated image g(x,y) by H(u,v) that is the result of the Fourier transform of the PSF h(x,y) in the frequency space can provide F(u,v) that is the result of the Fourier transform of the non-deteriorated image f(x,y). Therefore, performing inverse Fourier transform on the F(u,v) enables acquisition of the non-deteriorated image (restored image) f(x,y).

However, acquiring the restored image by such an image restoration process greatly amplifies a noise component generated by the image sensor, which makes it difficult to acquire a good image. In this regard, there is known an image restoration process using a Wiener filter, which is expressed by the following expression (4), for suppressing such noise amplification:

$$1/H(u,v) \times |H(u,v)|^2 / (|H(u,v)|^2 + \Gamma) \qquad (4),$$

where H(u,v) represents an OTF (Optical Transfer Function), and $\Gamma$ represents a constant to reduce an amplification amount of the noise component.

Multiplying an OTF having frequency information and phase information of the optical system by the expression (4) makes a phase of the PSF generated due to diffraction or aberration of the optical system zero and amplifies a frequency characteristic, which makes it possible to obtain a good image with a high resolution.

Moreover, Japanese Patent Laid-Open No. 2006-238032 discloses an image processing method that performs an image restoration process with setting a slight spread of a PSF after the image restoration process. Furthermore, Japanese Patent Laid-Open No. 2009-124568 discloses an image restoration process that restores a deteriorated image by using an image restoration filter produced from a PSF.

In the image pickup apparatus, the object image (optical image) formed by the optical system is electrically sampled by the image sensor (image pickup element) such as a CCD (Charge Coupled Device) and a CMOS (Complementary Metal Oxide Semiconductor Image Sensor). When being sampled by the image sensor, the optical image that is originally a continuous quantity is converted into discrete values by plural pixels of the image sensor, and thereby a frequency signal whose cycle corresponding to a sampling frequency is produced in the frequency space. Due to the cycle, when the frequency signal distributes over ½ of the sampling frequency, a frequency component of the frequency signal over the ½ of the sampling frequency is folded to generate an alias signal (or aliasing or folded signal), which makes it impossible to produce an accurate image signal. The frequency that is ½ of the sampling frequency is called a Nyquist frequency.

In general, significant amplification of a high frequency component in the image restoration process for restoring the deteriorated image amplifies not only the noise component but also the alias signal having frequencies over the Nyquist frequency, which generates moire, coloring, artifact or the like in the restored image.

SUMMARY OF THE INVENTION

The present invention provides an image processing apparatus, an image processing method and an image processing program capable of reducing negative effects caused by the amplification of the alias signal generated in the image sensor to enable acquisition of a good restored image.

The present invention provides as one aspect thereof an image processing apparatus including an image inputting part configured to acquire a captured image produced by an image pickup system including an optical system and an image sensor, a filter producing part configured to produce an image restoration filter, and a restoration processing part configured to perform an image restoration process on the captured image by using the image restoration filter to produce a restored image. The filter producing part is configured to generate an optical transfer function including an alias signal using an optical transfer function of the optical system and a sampling frequency of the image sensor and to set amplification factors for respective frequency components in the image restoration filter according to a frequency characteristic of the optical transfer function including the alias signal.

The present invention provides as another aspect thereof an image pickup apparatus including an image pickup system including an optical system and an image sensor, and the above image processing apparatus.

The present invention provides as still another aspect thereof an image processing method including an image acquiring step of acquiring a captured image produced by an image pickup system including an optical system and an image sensor, a filter producing step of producing an image restoration filter, and a restoring step of performing an image restoration process on the captured image by using the image restoration filter to produce a restored image. In the filter producing step, amplification factors for respective frequency components in the image restoration filter are set according to a frequency characteristic of an optical transfer function including an alias signal, and the optical transfer function including the alias signal is generated using an optical transfer function of the optical system and a sampling frequency of the image sensor.

The present invention provides as yet still another aspect thereof a non-transitory computer-readable storage medium storing an image processing program executable by a computer to execute an image processing method. The method includes an image acquiring step of causing the computer to acquire a captured image produced by an image pickup system including an optical system and an image sensor, a filter producing step of causing the computer to produce an image restoration filter, and a restoring step of causing the computer to perform an image restoration process on the captured image by using the image restoration filter to produce a restored image. The filter producing step includes a generating step of generating an optical transfer function including an alias signal using an optical transfer function of the optical system and a sampling frequency of the image sensor, and a setting step of setting amplification factors for respective frequency components in the image restoration filter according to a frequency characteristic of the optical transfer function including the alias signal.

The present invention provides as further another aspect thereof an image processing method including an image acquiring step of acquiring a captured image produced by an image pickup system including an optical system and an image sensor, an image pickup condition for the captured image and information for specifying a size of a pixel of the image sensor, a coefficient acquiring step of acquiring coefficient data corresponding to the image pickup condition, a filter producing step of producing an image restoration filter based on the coefficient data and the information for specifying the size of the pixel of the image sensor, and a restoring step of performing an image restoration process on the captured image by using the image restoration filter to produce a restored image.

The present invention provides as still further another aspect thereof an image processing program that causes a computer to execute image processing. The program includes an image acquiring step of causing the computer to acquire a captured image produced by an image pickup system including an optical system and an image sensor, an image pickup condition for the captured image and information for specifying a size of a pixel of the image sensor, a coefficient acquiring step of causing the computer to acquire coefficient data corresponding to the image pickup condition, a filter producing step of causing the computer to produce an image restoration filter based on the coefficient data and the information for specifying the size of the pixel of the image sensor, and a restoring step of causing the computer to perform an image restoration process on the captured image by using the image restoration filter to produce a restored image.

The present invention provides as yet still further another aspect thereof an image processing apparatus including an image acquiring part configured to acquire a captured image produced by an image pickup system including an optical system and an image sensor, an image pickup condition for the captured image and information for specifying a size of a pixel of the image sensor, a coefficient acquiring part configured to acquire coefficient data corresponding to the image pickup condition, a filter producing part configured to produce an image restoration filter based on the coefficient data and the information for specifying the size of the pixel of the image sensor, and a restoring processing part configured to perform an image restoration process on the captured image by using the image restoration filter to produce a restored image.

Further features of the present invention will become apparent from the following description of exemplary embodiments (with reference to the attached drawings).

BRIEF DESCRIPTION OF THE DRAWINGS

FIGS. 5A and 5B show examples of PSFs according to amplitude of optical system aberration.

FIGS. 6A and 6B show examples of an MTF and an alias signal before the image restoration process when the optical system aberration is small.

FIG. 17 shows an example of an MTF after the image restoration process with the image restoration filter of Embodiment 3 when the optical system aberration is large.

FIG. 18 shows an example of images before and after the image restoration process.

FIG. 21 shows an example of restoration gains in the frequency band up to the sampling frequency of the image sensor.

FIGS. 22A to 22C show examples of pixel arrangements for respective color components in the image sensor.

DESCRIPTION OF THE PREFERRED EMBODIMENTS

Exemplary embodiments of the present invention will hereinafter be described with reference to the accompanying drawings.

Embodiment 1

Figure 1:
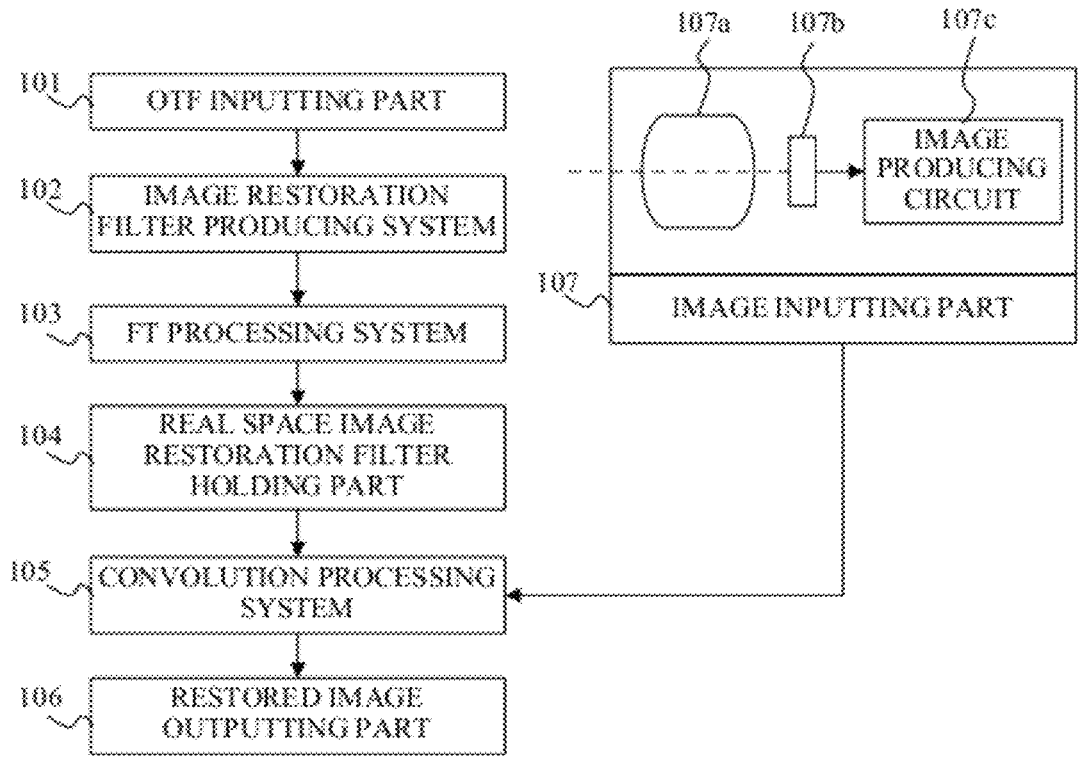
FIG. 1 is a block diagram showing the configuration of an image processing apparatus that is Embodiment 1 of the present invention.

FIG. 1 shows the configuration of an image pickup apparatus as an image processing apparatus that is a first embodiment (Embodiment 1) of the present invention. The image pickup apparatus of this embodiment includes an image inputting part (image acquiring part) 107. The image inputting part 107 includes an image-taking optical system 107a, an image sensor (image pickup element) 107b that photoelectrically converts an object image (optical image) formed by the image-taking optical system 107a, and an image producing circuit 107c that produces a captured image based on an output signal from the image sensor 107b.

Moreover, the image pickup apparatus includes an OTF inputting part 101, an image restoration filter producing system 102, a Fourier transform processing system 103, a real space image restoration filter holding part 104, a convolution processing system 105, and a restored image outputting part 106.

In this embodiment, the OTF inputting part 101 acquires a Nyquist frequency of an OTF (Optical Transfer Function) of an image pickup system including the image-taking optical system 107a and the image sensor 107b. The OTF to be used herein can be acquired as a computer simulation result of the image-taking optical system 107a.

The image restoration filter producing system 102 produces an image restoration filter from the OTF input to the OTF inputting part 101. The image restoration filter producing system 102 sets amplification factors of the image restoration filter for respective frequency components of the captured image (MTF), according to (that is, in consideration of) a frequency characteristic of an alias signal (aliasing) generated in the image sensor 107b.

The alias signal is a signal having a frequency that exceeds a Nyquist frequency decided from a size of one pixel (pixel size) of the image sensor 107b. When b represents the pixel size, the Nyquist frequency is expressed by 1/(2b).

The Fourier transform processing system 103 performs a Fourier transform on the image restoration filter produced in consideration of the frequency characteristic of the alias signal by the image restoration filter producing system 102 to produce an image restoration filter for a real space. The OTF inputting part 101, the image restoration filter producing system 102 and the Fourier transform processing system 103 constitute a filter producing part.

The real space image restoration filter holding part 104 holds the image restoration filter for the real space produced by the Fourier transform processing system 103.

The convolution processing system 105, which is an image restoration processing part, performs a convolution process (image restoration process) on the captured image acquired from the image inputting part 107 by using the image restoration filter for the real space held by the real space image restoration filter holding part 104. The restored image outputting part 106 outputs a restored image, which is a good image with a high resolution, produced by the image restoration process performed by the convolution processing system 105. The output restored image is recorded in a recording medium such as a semiconductor memory, or displayed on a monitor.

The image restoration filter may be produced each time the acquisition of the captured image, or may be produced and stored before the acquisition of the captured image. In the latter case, the image restoration process can be performed only by acquiring the captured image from the image inputting part 107.

Figure 2:
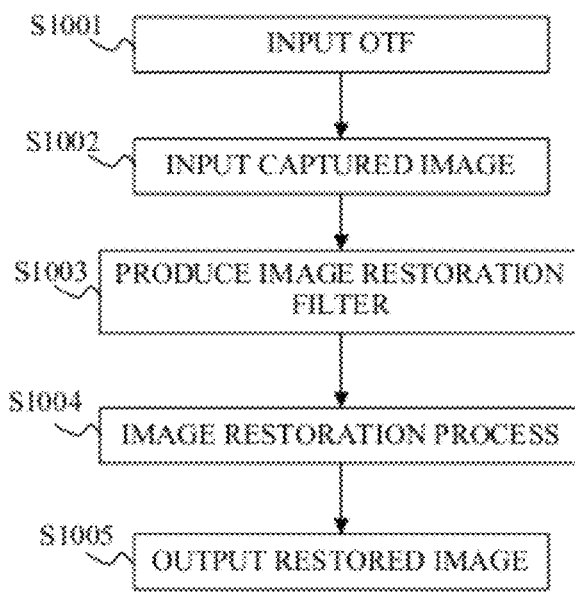
FIG. 2 is a flowchart showing an image restoration process in Embodiment 1.

FIG. 2 is a flowchart showing a procedure of the image processing (image processing method) performed in the image processing apparatus shown in FIG. 1. The image processing is performed by the image processing apparatus that is a computer according to an image processing program as a computer program.

At step S1001, the OTF is input to the OTF inputting part 101. Then, at step S1002, the captured image is input from the image inputting part 107.

Next, at step S1003, the image restoration filter producing system 102 produces, from the input OTF, the image restoration filter corresponding to the frequency characteristic of the alias signal. In addition, the Fourier transform processing system 103 performs the Fourier transform on the image restoration filter produced by the image restoration filter producing system 102 to produce the image restoration filter for the real space. Then, at step S1004, the convolution processing system 105 performs convolution of the captured image in the real space with the image restoration filter produced by the Fourier transform processing system 103 to produce a good restored image with a high resolution. Next, at step S1005, the restored image is output from the restored image outputting part 106.

Embodiment 2

Figure 3:
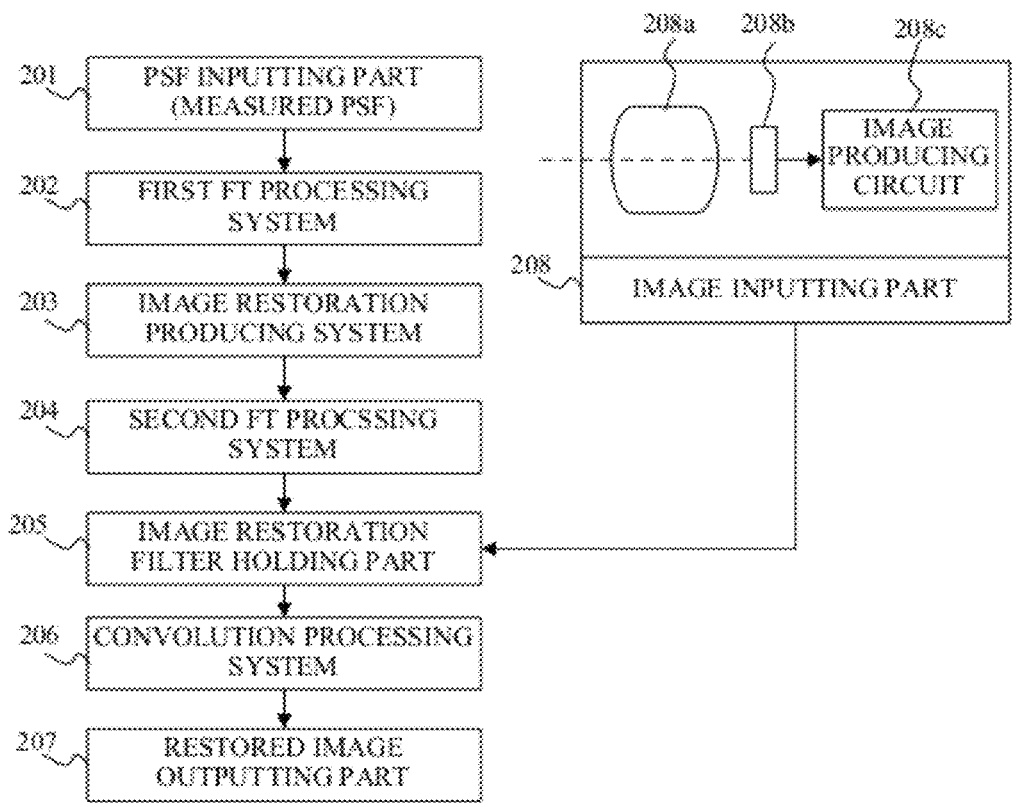
FIG. 3 is a block diagram showing the configuration of an image processing apparatus that is Embodiment 2 of the present invention.

FIG. 3 shows the configuration of an image pickup apparatus as an image processing apparatus that is a second embodiment (Embodiment 2) of the present invention. The image pickup apparatus of this embodiment includes an image inputting part (image acquiring part) 208. The image inputting part 208 includes an image-taking optical system 208a, an image sensor (image pickup element) 208b that photoelectrically converts an object image (optical image) formed by the image-taking optical system 208a, and an image producing circuit 208c that produces a captured image based on an output signal from the image sensor 208b.

Moreover, the image pickup apparatus includes a PSF inputting part 201, a first Fourier transform processing system 202, an image restoration filter producing system 203, a second Fourier transform processing system 204, an image restoration filter holding part 205, a convolution processing system 206, and a restored image outputting part 207.

The PSF inputting part 201 acquires an actually measured PSF (Point Spread Function) and a Nyquist frequency of the measured PSF. The first Fourier transform processing system 202 performs a Fourier transform from the measured PSF to an OTF (Optical Transfer Function) to provide the OTF based on the measured PSF.

The image restoration filter producing system 203 produces an image restoration filter from the OTF produced by the Fourier transform. The image restoration filter producing system 203 sets amplification factors of the image restoration filter for respective frequency components of the captured image (MTF), according to (that is, in consideration of) a frequency characteristic of an alias signal (aliasing), in other words, according to a frequency characteristic of an OTF including an alias signal generated in the image sensor 208b.

As well as in Embodiment 1, the alias signal is a signal having a frequency that exceeds the Nyquist frequency decided from the pixel size of the image sensor 208b. When b represents the pixel size, the Nyquist frequency is expressed by 1/(2b).

The second Fourier transform processing system 204 performs a Fourier transform on the image restoration filter produced in consideration of the frequency characteristic of the alias signal by the image restoration filter producing system 203 to produce an image restoration filter for a real space. The PSF inputting part 201, the first Fourier transform processing system 202, the image restoration filter producing system 203 and the second Fourier transform processing system 204 constitute a filter producing part.

The image restoration filter holding part 205 holds the image restoration filter for the real space produced by the second Fourier transform processing system 204.

The convolution processing system 206, which is an image restoration processing part, performs a convolution process (image restoration process) on the captured image acquired from the image inputting part 208 including the image sensor 208b, by using the image restoration filter for the real space held by the image restoration filter holding part 205.

The restored image outputting part 207 outputs a restored image, which is a good image with a high resolution, produced by the image restoration process performed by the convolution processing system 206. The output restored image is recorded in a recording medium such as a semiconductor memory, or displayed on a monitor.

As well as in Embodiment 1, the image restoration filter may be produced each time the acquisition of the captured image, or may be produced and stored before the acquisition of the captured image. In the latter case, the image restoration process can be performed only by acquiring the captured image from the image inputting part 208.

Figure 4:
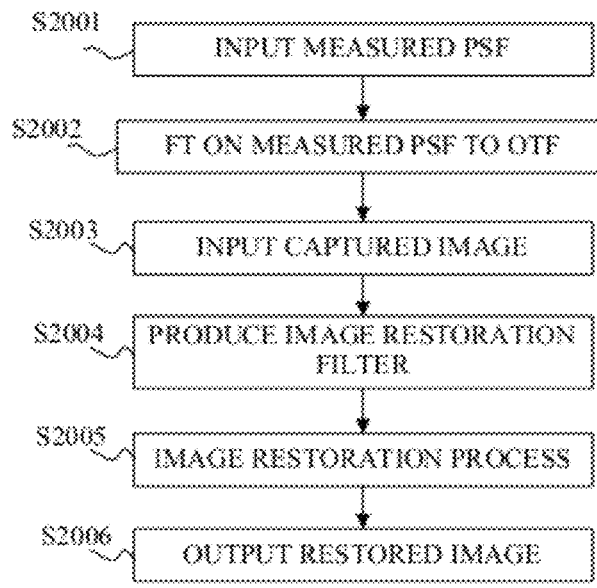
FIG. 4 is a flowchart showing an image restoration process in Embodiment 2.

FIG. 4 is a flowchart showing a procedure of the image processing (image processing method) performed in the image processing apparatus shown in FIG. 3. The image processing is performed by the image processing apparatus that is a computer according to an image processing program as a computer program.

At step S2001, the measured PSF is input to the PSF inputting part 201. Then, at step S2002, the first Fourier transform processing system 202 performs the Fourier transform on the input measured PSF to acquire an OTF. Next, at step S2003, the captured image is input from the image inputting part 208.

Next, at step S2004, the image restoration filter producing system 203 produces, from the OTF acquired by the Fourier transform from the measured PSF, the image restoration filter corresponding to the frequency characteristic of the alias signal. In addition, the second Fourier transform processing system 204 performs the Fourier transform on the image restoration filter produced by the image restoration filter producing system 203 to produce the image restoration filter for the real space. Then, at step S2005, the convolution processing system 206 performs convolution of the captured image in the real space with the image restoration filter produced by the second Fourier transform processing system 204 to produce a good restored image with a high resolution. Next, at step S2006, the restored image is output from the restored image outputting part 207.

Embodiment 3

Next, detailed description of the image restoration process performed in Embodiments 1 and 2 will be made as a third embodiment (Embodiment 3) of the present invention. There have conventionally been proposed various image restoration processes for restoring an image deteriorated due to diffraction generated in an optical system and aberration of the optical system to a high-resolution image. However, there has never been proposed a method for reducing negative effects of the image restoration process caused due to an alias signal (hereinafter also referred to as an "aliasing component") that may be generated in an image sensor. Thus, this embodiment performs an image restoration process capable of reducing the above-mentioned negative effects to acquire a better image with a higher resolution.

First, description will be made of an outline of the image restoration process of this embodiment. The diffraction generated in the optical system (image-taking optical system) and the aberration of the image-taking optical system are different in kind and absolute amount depending on conditions such as a focal length (zoom position) of the image-taking optical system, an object distance (focus position) and an image height. Therefore, the PSF (Point Spread function) and the OTF (Optical transfer function) are also different depending on these conditions. Thus, this embodiment produces various image restoration filters corresponding to the respective conditions, and performs the image restoration process with appropriately switching the image restoration filter to be used.

However, when performing such an image restoration process, since frequency characteristics of the image restoration filters corresponding to amplitudes of spatial spreads of the PSFs for the respective conditions are greatly different from each other, the following problem is caused in the image restoration process.

In an area where the spatial spread of the PSF is small, such as a central area of an image, the OTF therein has a sufficiently large value also in a high frequency band exceeding the Nyquist frequency. Therefore, the image restoration filter includes a large amount of the aliasing component. On the other hand, in an area where the spatial spread of the PSF is large, such as a marginal area of the image, the OTF has almost no value in the high frequency band exceeding the Nyquist frequency. Therefore, the image restoration filter also includes almost no alias component. Since the image restoration filters corresponding to the above conditions have greatly different frequency characteristics, uniform amplification of these frequency characteristics causes the negative effects due to the high frequency alias component, such as moire, coloring and artifact.

As a method for solving such a problem, this embodiment sets, as described in Embodiments 1 and 2, the amplification factors of the respective frequency components in the image restoration filter, in consideration of the frequency characteristic (spatial frequency characteristic) of the alias component.

Normally, an amplification process causing the OTF to become 1 in an entire frequency band greatly amplifies noise generated by the image sensor, which makes it impossible to acquire a good image. Thus, a Wiener filter is generally known which suppresses the noise amplification to enable acquisition of a good image. On the other hand, the image restoration process of this embodiment enables not only the suppression of the noise amplification but also suppression of amplification of the alias component, which makes it possible to acquire a better restored image.

Next, description will be made of technical contents of the image restoration process of this embodiment. This embodiment uses an image restoration filter (Filter) shown by, for example, the following expression (5). However, this image restoration filter is merely one example of the image restoration filter produced in consideration of the spatial frequency characteristic of the alias component, and other image restoration filters may be used.

$$\text{Filter}=1/H(u,v)\times|H(u,v)|^2/(|H(u,v)|^2+\Gamma+|h(u-u\_\text{sampling},v-v\_\text{sampling})|) \quad (5)$$

where H(u,v) represents an OTF (Optical Transfer Function), u_sampling represents a sampling frequency at a spatial frequency u in the image sensor, v_sampling represents a sampling frequency at a spatial frequency v in the image sensor, and Γ represents a constant for reducing the amplification amount of the noise.

An example of the image restoration process that uses the image restoration filter shown by the expression (5) is shown below. An axial OTF of the optical image includes a large amount of a high frequency component, so that a generation amount of the alias component is increased. However, producing the image restoration filter in consideration of the spatial frequency characteristic of the alias component suppresses amplification in a frequency band including a large amount of the alias component. Accordingly, the negative effects caused due to the image restoration process such as the moire, coloring and artifact can be suppressed.

Moreover, an off-axis OTF of the optical image includes a small amount of the high frequency component, so that the generation amount of the alias component is small. However, producing the image restoration filter in consideration of the spatial frequency characteristic of the alias component increases the amplification amount in a frequency band including the small amount of the alias component. Accordingly, a high resolution can be obtained.

FIG. 5A shows a PSF in a case where aberration of the optical system is small. FIG. 6A shows an MTF (Modulation Transfer Function) in the same case. In FIG. 6A (and FIG. 6B and FIGS. 7-11), a horizontal axis shows frequency whose maximum value is the Nyquist frequency. In FIG. 6A (and FIG. 6B), a vertical axis shows frequency characteristic of the MTF.

In FIG. 6A, the MTF has a significant value at the Nyquist frequency. In such a case, an alias component (alias signal) is generated as shown by a broken line in FIG. 6B, which changes the MTF as shown in FIG. 7.

Figure 7:
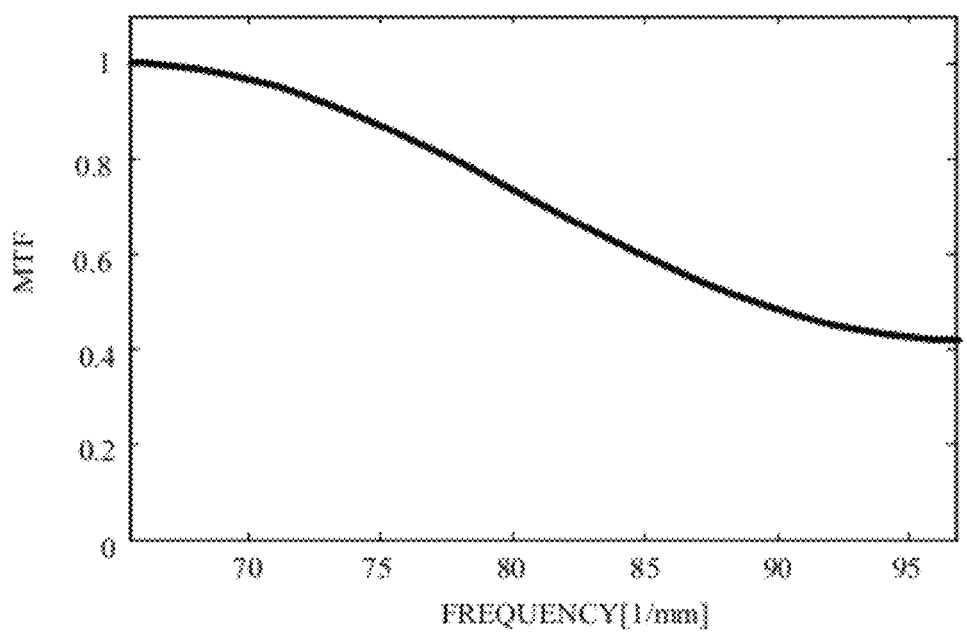
FIG. 7 shows an example of the MTF before the image restoration process when the optical system aberration is small.

Producing the image restoration filter based on the MTF shown in FIG. 7 greatly amplifies the alias signal, which causes the negative effects such as the moire, coloring and artifact in the image after the image restoration process. Such negative effects are easily generated by, especially, greatly amplifying the MTF at the vicinity of the Nyquist frequency.

In this description, a ratio of the MTFs before and after the image restoration process is defined as a "Restoration Gain" as follows:

Restoration Gain=MTF after the image restoration process/MTF before the image restoration process.

This embodiment provides, to the image restoration filter, a frequency characteristic that can reduce the Restoration Gain in the frequency band where a large amount of the alias signal is generated, in order to suppress generation of the above-described negative effects. In other words, this embodiment sets the amplification factors for the respective frequency component such that the amplification factor is smaller for the frequency component in which the generation amount of the alias signal is larger.

Figure 8:
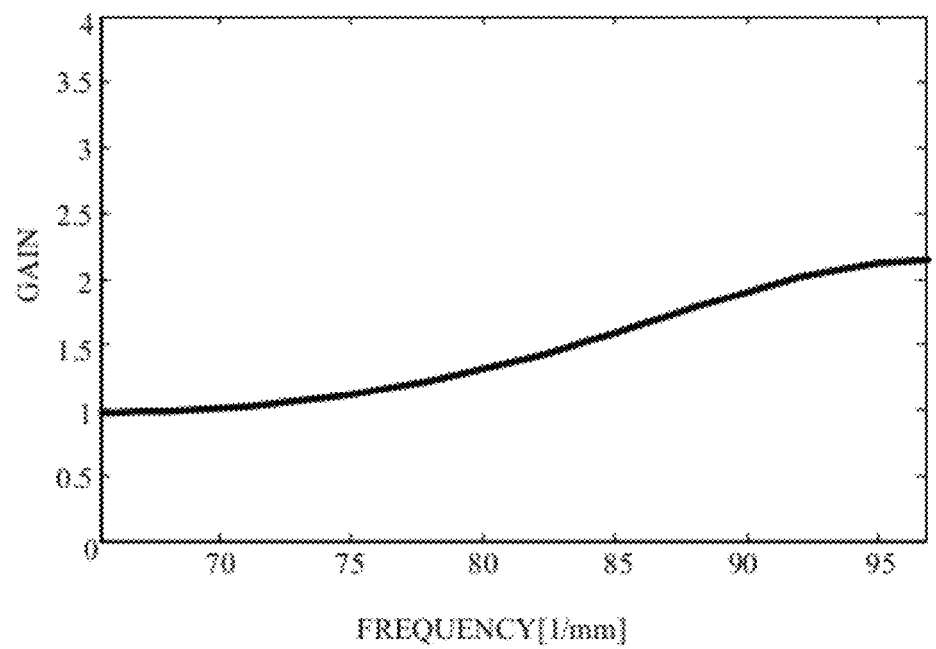
FIG. 8 shows an example of restoration gains provided by a Wiener filter when the optical system aberration is small.
Figure 9:
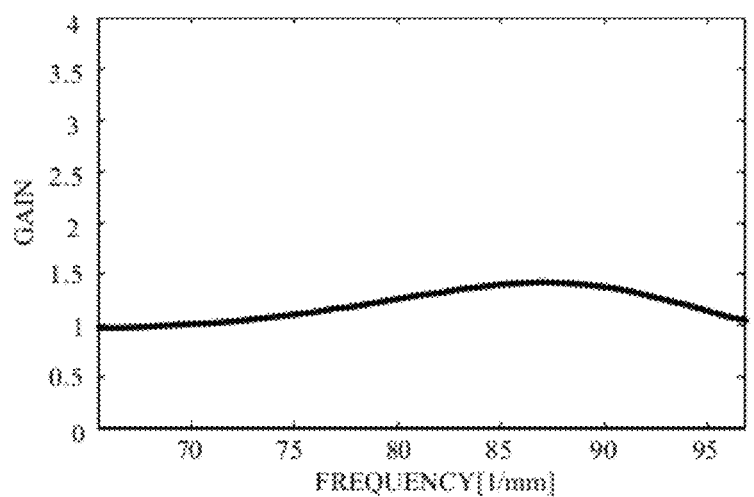
FIG. 9 shows an example of restoration gains provided by an image restoration filter of Embodiment 3 of the present invention when the optical system aberration is small.

FIG. 8 shows the Restoration Gain (vertical axis) when using a normal Wiener filter expressed by the expression (4). Moreover, FIG. 9 shows the Restoration Gain (vertical axis) when using the image restoration filter of this embodiment produced in consideration of the frequency characteristic of the alias signal.

Figure 10:
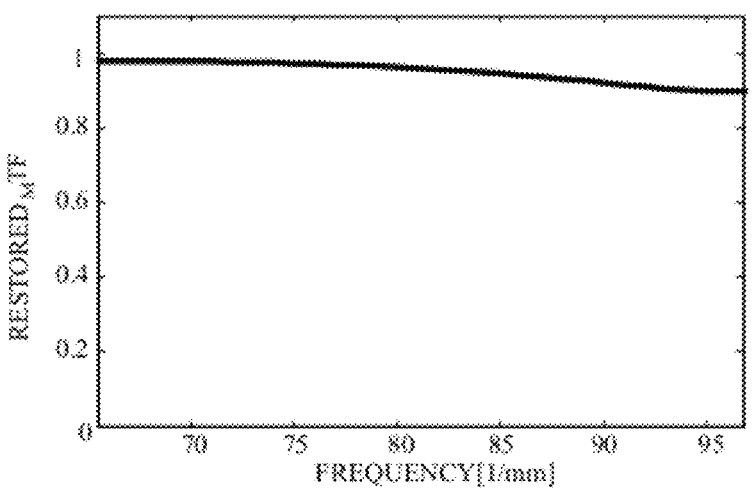
FIG. 10 shows an example of an MTF after the image restoration process with the Wiener filter when the optical system aberration is small.

First, description will be made of the image restoration process with the Wiener filter. An MTF (vertical axis) after the image restoration process shown in FIG. 10 is obtained by multiplying the MTF before the image restoration process shown in FIG. 7 by the Restoration Gain provided by the Wiener filter expressed by the expression (4) and shown in FIG. 8. In the image restoration process with the Wiener filter, since the Restoration Gain has a significant value even at the vicinity of the Nyquist frequency where the alias signal has a largest value, the negative effects may be caused by the amplification of the MTF at the Nyquist frequency.

Figure 11:
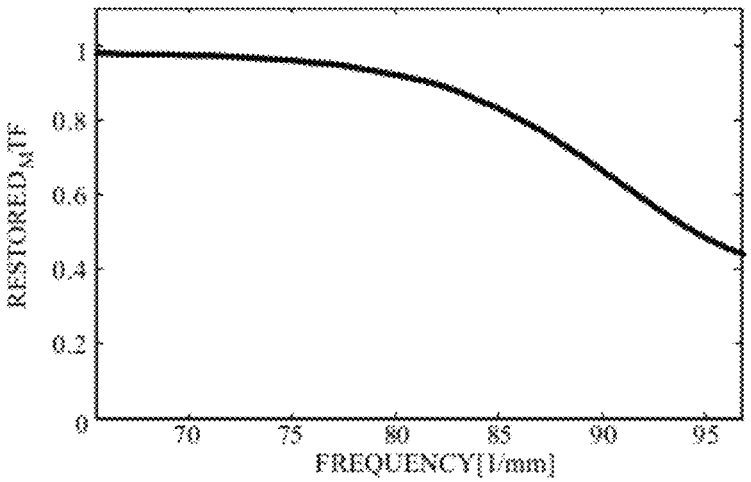
FIG. 11 shows an example of an MTF after the image restoration process with the image restoration filter of Embodiment 3 when the optical system aberration is small.

Next, description will be made of the image restoration process with the image restoration filter of this embodiment produced in consideration of the frequency characteristic of the alias signal. An MTF (vertical axis) after the image restoration process shown in FIG. 11 is obtained by multiplying the MTF before the image restoration process shown in FIG. 7 by the Restoration Gain provided by the image restoration filter produced in consideration of the frequency characteristic of the alias signal, which is expressed by the expression (5) and shown in FIG. 9.

In the image restoration process with the image restoration filter of this embodiment, since the Restoration Gain has a minute value at the vicinity of the Nyquist frequency where the alias signal has a largest value, it is possible to suppress the amplification of the MTF at the Nyquist frequency, and thereby reducing the negative effects.

The image restoration filter may be produced in consideration of not only the frequency characteristic of the alias signal that may be generated by the image sensor, but also a frequency characteristic of an alias signal that may be generated by an optical low-pass filter.

Figure 12A:
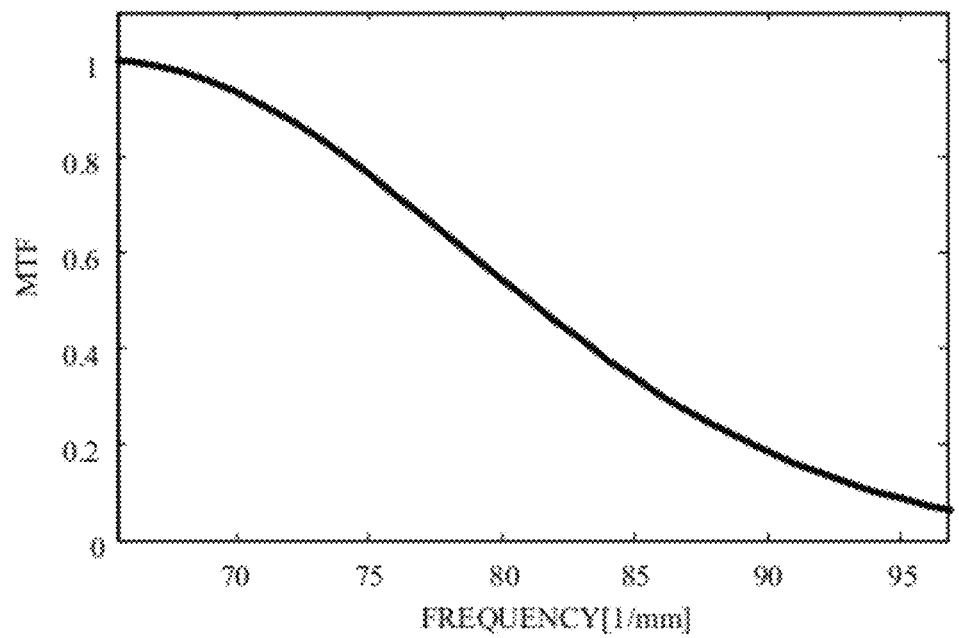
FIGS. 12A and 12B show examples of an MTF and an alias signal before the image restoration process when the optical system aberration is large.
Figure 12B:
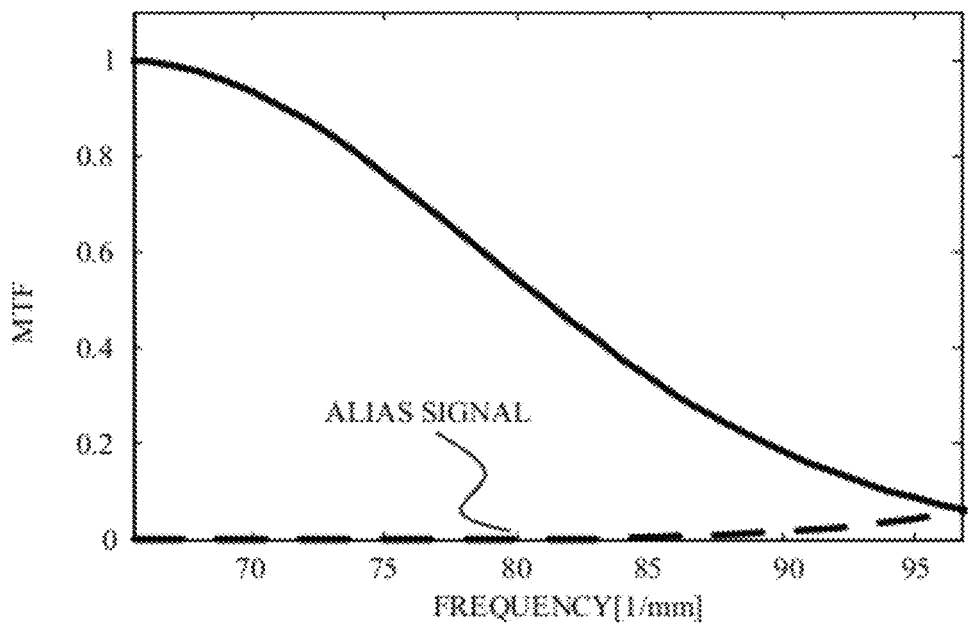

FIG. 5B shows a PSF in a case where aberration of the optical system is large. FIG. 12A shows an MTF in the same case. In FIG. 12A (and FIG. 12B and FIGS. 13-17), a horizontal axis shows frequency whose maximum value is the Nyquist frequency. In FIG. 12A (and FIG. 12B), a vertical axis shows frequency characteristic of the MTF.

In FIG. 12A, the MTF has a small value at the Nyquist frequency. In such a case, an alias signal is generated as shown by a broken line in FIG. 12B, which changes the MTF as shown in FIG. 13.

Figure 13:
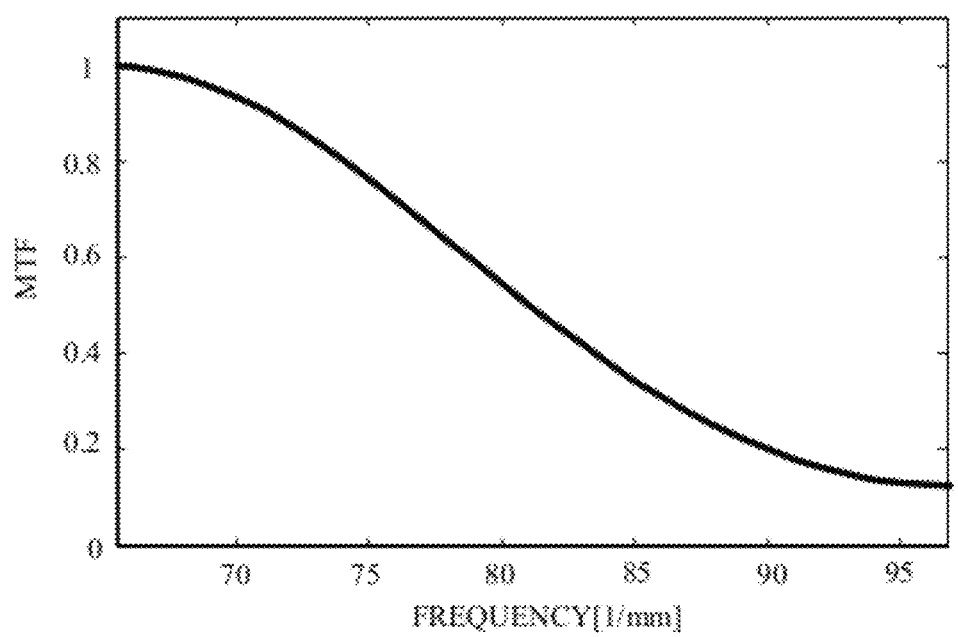
FIG. 13 shows an example of the MTF before the image restoration process when the optical system aberration is large.

Producing the image restoration filter based on the MTF shown in FIG. 13 greatly amplifies the alias signal, which causes the negative effects such as the moire, coloring and artifact in the image after the image restoration process. Such negative effects are easily generated by, especially, greatly amplifying the MTF at the vicinity of the Nyquist frequency.

This embodiment provides, to the image restoration filter, a frequency characteristic that can reduce the Restoration Gain in the frequency band where a large amount of the alias signal is generated, in order to suppress generation of the above-described negative effects. In other words, this embodiment sets the amplification factors for the respective frequency component such that the amplification factor is smaller for the frequency component in which the generation amount of the alias signal is larger.

Figure 14:
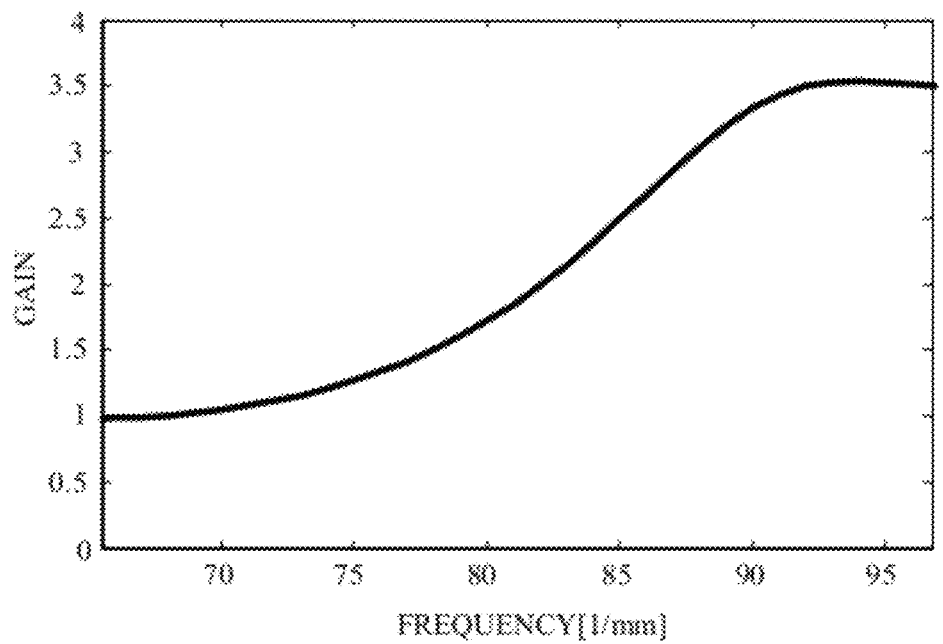
FIG. 14 shows an example of restoration gains provided by the Wiener filter when the optical system aberration is large.
Figure 15:
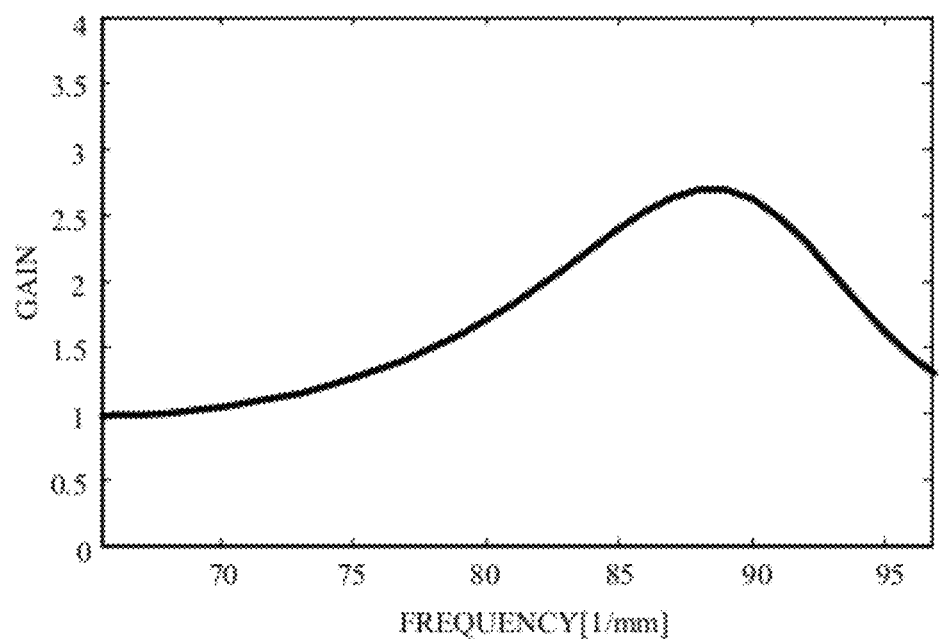
FIG. 15 shows an example of restoration gains provided by the image restoration filter of Embodiment 3 when the optical system aberration is large.

FIG. 14 shows the Restoration Gain (vertical axis) when using a normal Wiener filter expressed by the expression (4). Moreover, FIG. 15 shows the Restoration Gain (vertical axis) when using the image restoration filter of this embodiment produced in consideration of the frequency characteristic of the alias signal.

Figure 16:
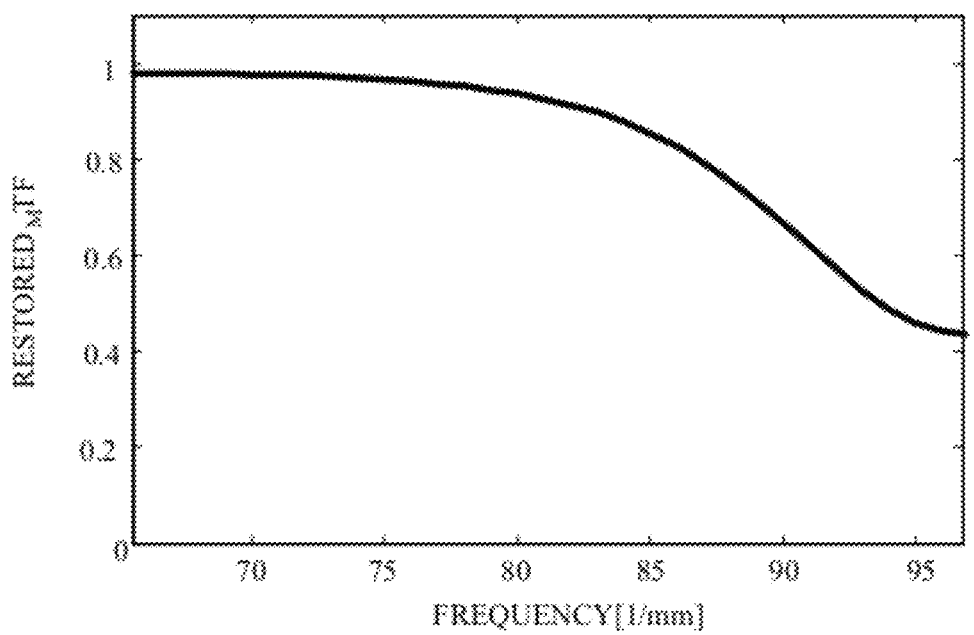
FIG. 16 shows an example of an MTF after the image restoration process with the Wiener filter when the optical system aberration is large.

First, description will be made of the image restoration process with the Wiener filter. An MTF (vertical axis) after the image restoration process shown in FIG. 16 is obtained by multiplying the MTF before the image restoration process shown in FIG. 13 by the Restoration Gain provided by the Wiener filter expressed by the expression (4) and shown in FIG. 14. In the image restoration process with the Wiener filter, since the Restoration Gain has a significant value even at the vicinity of the Nyquist frequency where the alias signal has a largest value, the negative effects may be caused by the amplification of the MTF at the Nyquist frequency.

Next, description will be made of the image restoration process with the image restoration filter of this embodiment produced in consideration of the frequency characteristic of the alias signal. An MTF (vertical axis) after the image restoration process shown in FIG. 17 is obtained by multiplying the MTF before the image restoration process shown in FIG. 13 by the Restoration Gain provided by the image restoration filter produced in consideration of the frequency characteristic of the alias signal, which is expressed by the expression (5) and shown in FIG. 15.

In the image restoration process with the image restoration filter of this embodiment, since the Restoration Gain has a minute value at the vicinity of the Nyquist frequency where the alias signal has a largest value, it is possible to suppress the amplification of the MTF at the Nyquist frequency, and thereby reducing the negative effects.

FIG. 18A shows an example of an image before the image restoration process. The image restoration process with the image restoration filter described in this embodiment process provides a restored image exemplified in FIG. 18B.

Although Embodiments 1 and 2 have described the image pickup apparatus including the image processing apparatus performing the image restoration process, there is an alternative embodiment in which the image processing apparatus constituted by a personal computer separate from the image pickup apparatus takes in a captured image produced by the image pickup apparatus and then produces a restored image with the image processing program described in Embodiment 1 or 2.

Moreover, although Embodiment 3 has described the case of setting the amplification factor to be smaller for the frequency component in which the generation amount of the aliasing signal is larger, the setting of the amplification factor is not limited to such setting, and may be made in consideration of various elements.

In addition, Embodiment 3 has described the case of when the amplification factor for each frequency component in the image restoration filter on the basis of the MTF including the alias signal (in other words, according to a frequency characteristic of an OTF including an alias signal). However, the amplification factor for each frequency component in the image restoration filter may be set on the basis of a ratio of a frequency characteristic of the MTF of the image pickup system not including the alias signal and the frequency characteristic of the alias signal.

Embodiment 4

A fourth embodiment (Embodiment 4) of the present invention will describe a case of using an image restoration filter (Filter) expressed by, for example, the following expression (6) for pixels arranged in a so-called Bayer arrangement like RGB pixel arrangement of an image sensor. However, this image restoration filter is merely one example of the image restoration filter produced in consideration of the spatial frequency characteristic of the alias signal, and other image restoration filters may be used.

$$\text{Filter}(u,v) = 1/(H(u,v) \otimes M(u,v)) \times |H(u,v) \otimes M(u,v)|^2/(|H(u,v) \otimes M(u,v)|^2 + \text{Gainfunc}(u,v) \otimes M(u,v) + \Gamma) \quad (6).$$

In the expression (6), H(u,v) represents an OTF (Optical Transfer Function), M(u,v) represents a frequency characteristic corresponding to the pixel arrangement of the image sensor, Gainfunc represents a function for controlling the Restoration Gain of the image restoration filter according to frequency, that is, a function to decide the amplification factor, and $\Gamma$ represents a constant to reduce the amplification amount of the noise.

Figure 19:
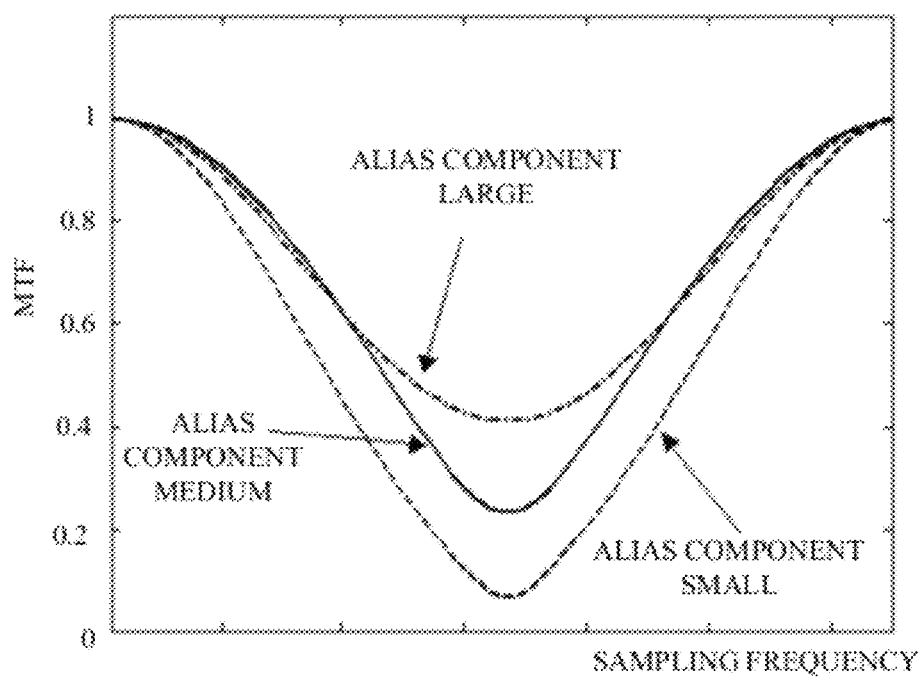
FIG. 19 shows an example of an MTF before the image restoration process in a frequency band up to a sampling frequency of an image sensor.

FIG. 19 shows MTFs in cases where the amount of the alias signal is large, medium and small in a frequency band up to the sampling frequency of the image sensor. In general, the MTFs in the cases where the amount of the alias signal is large, medium and small respectively correspond to MTFs in cases where the amount of aberration is small, medium and large.

Figure 20:
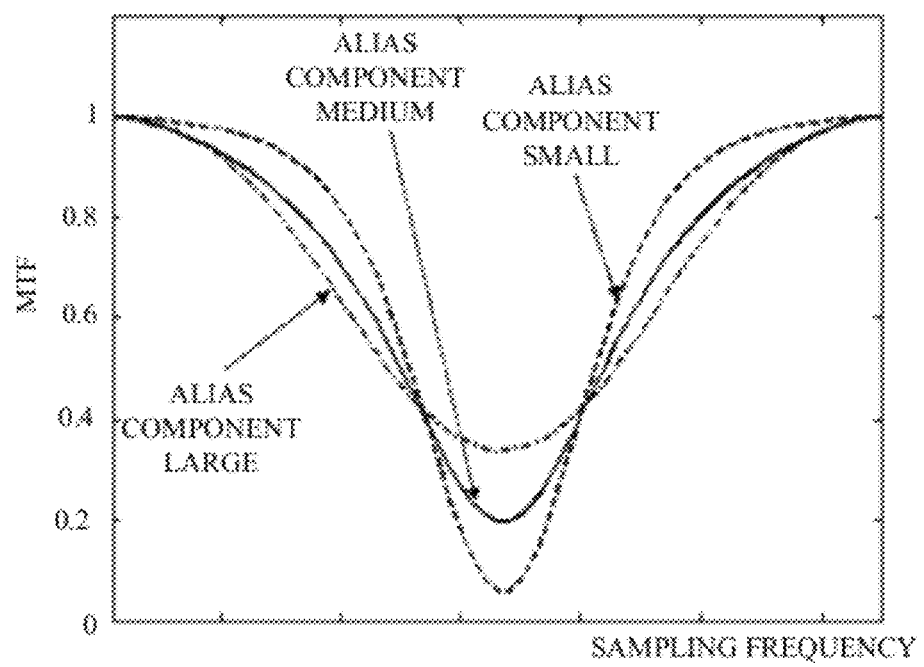
FIG. 20 shows an example of an MTF after the image restoration process in the frequency band up to the sampling frequency of the image sensor.

Each of MTFs (vertical axis) after the image restoration process shown in FIG. 20 is obtained by multiplying the MTF before the image restoration process shown in FIG. 19 by the Restoration Gain provided by the image restoration filter produced in consideration of the frequency characteristic of the alias signal, which is expressed by the expression (6) and shown in FIG. 21.

In the image restoration process with the image restoration filter of this embodiment, since the Restoration Gain has a minute value at the vicinity of the Nyquist frequency where the alias signal has a largest value, it is possible to suppress the amplification of the MTF at the Nyquist frequency, and thereby reducing the negative effects.

FIGS. 22A-22C show examples of pixel arrangements for respective color components (for example, R, G and B) in an image sensor used in a digital camera. FIG. 22A shows the pixel arrangement for G, FIG. 22B shows the pixel arrangement for R, and FIG. 22C shows the pixel arrangement for the B.

In a single image sensor, pixels respectively having sensitivities to R, G and B are arranged at mutually different positions, and such pixel arrangement for each color is referred to as "mosaic arrangement". Considering an alias signal due to a frequency characteristic of the mosaic arrangement makes it possible to perform the image restoration process on respective color images (for example, R, G and B images) whose pixel arrangements are mutually different. In FIGS. 22A to 22C, a light-sensitive pixel (white) is denoted by 1, and a light-insensitive pixel (black) is denoted by 0. The pixels sensitive to R, G and B are respectively represented by m_R(x,y), m_G(x,y) and m_B(x,y).

The image restoration filters in respective frequency spaces of R, G and B are expressed as follows:

$$\text{Filter\_R}(u,v) = 1/(H\_R(u,v) \otimes M\_R(u,v)) \times |H\_R(u,v) \otimes M\_R(u,v)|^2/(|H\_R(u,v) \otimes M\_R(u,v)|^2 + \text{Gainfunc\_R}(u,v) \otimes M\_R(u,v) + \Gamma\_R)$$

$$\text{Filter\_G}(u,v) = 1/(H\_G(u,v) \otimes M\_G(u,v)) \times |H\_G(u,v) \otimes M\_G(u,v)|^2/(|H\_G(u,v) \otimes M\_G(u,v)|^2 + \text{Gainfunc\_G}(u,v) \otimes M\_G(u,v) + \Gamma\_G)$$

$$\text{Filter\_B}(u,v) = 1/(H\_B(u,v) \otimes M\_B(u,v)) \times |H\_B(u,v) \otimes M\_B(u,v)|^2/(|H\_B(u,v) \otimes M\_B(u,v)|^2 + \text{Gainfunc\_B}(u,v) \otimes M\_B(u,v) + \Gamma\_B)$$

And, using a frequency band up to the Nyquist frequency of the image sensor in a state where there is no light-insensitive pixel as frequency bands in the pixel arrangements of the respective color components makes it possible to perform the image restoration process on the respective color images.

In the above expressions, Filter_R(u,v), Filter_G(u,v) and Filter_B(u,v) represent the image restoration filters in the frequency spaces set in consideration of the frequency bands of the pixel arrangements for the respective color components (R,G and B) in the mage sensor. H_R(u,v), H_G(u,v) and H_B(u,v) represent OTFs of optical aerial images of R, G and B. M_R(u,v), M_G(u,v) and M_B(u,v) represent the frequency characteristics corresponding to the pixel arrangements for R, G and B in the mage sensor, which are results of Fourier transform performed on m_R(x,y), m_G(x,y) and m_B(x,y), respectively.

Figure 23:
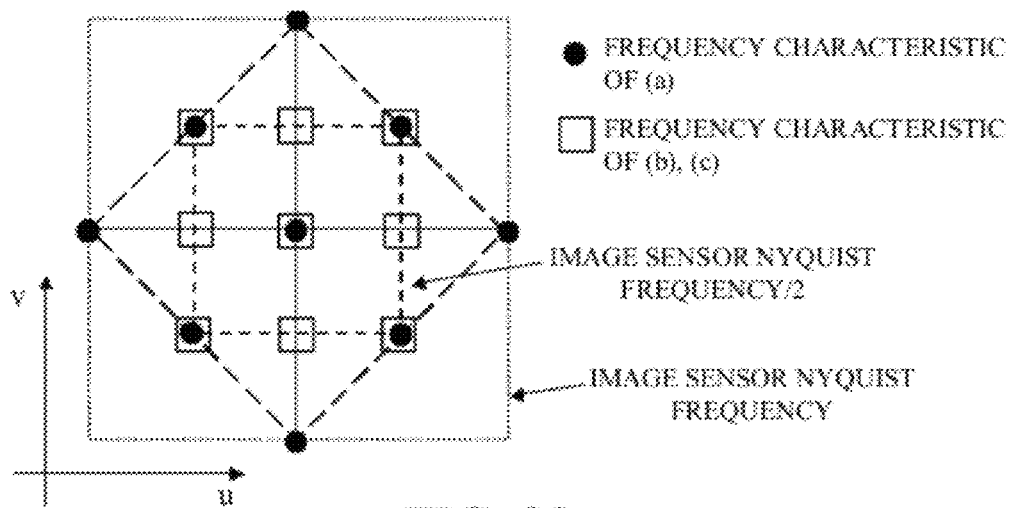
FIG. 23 shows an example of a frequency characteristic in the pixel arrangements for the respective color components in the image sensor.

FIG. 23 shows specific functions of the frequency characteristics. The frequency characteristic M_G(u,v) is a comb function in which 1 exists only at positions shown by "●". The frequency characteristics M_R(u,v) and M_B(u,v) are comb functions in which 1 exists only at positions shown by "□". A "Nyquist frequency" shown in the figure corresponds to a Nyquist frequency in a state where there is no light-insensitive pixel in an image (image sensor) that is one image into which the respective color images having the mutually different pixel arrangements are converted.

Moreover, in the above expressions, Gainfunc_R(u,v), Gainfunc_G(u,v) and Gainfunc_B(u,v) represent functions for controlling the Restoration Gain of the image restoration filters according to frequency, in other words, functions for deciding the amplification factors according to color. Furthermore, ⊛ represents a convolution operation, and Γ_R, Γ_G and Γ_B represent constants to reduce the amplification amount of the noise.

Figure 24:
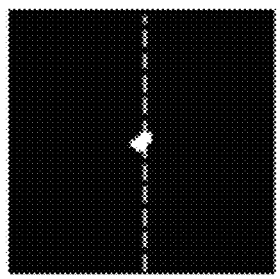
FIG. 24 shows an example of a PSF having an asymmetric shape at a marginal image height.
Figure 25:
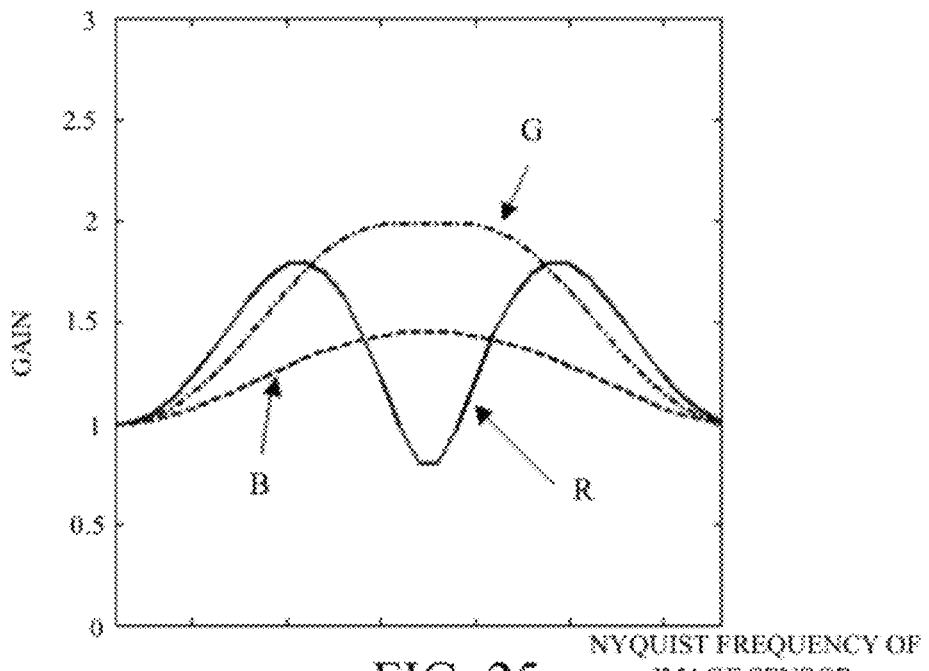
FIG. 25 shows an example of restoration gains applied on the PSF at the marginal image height.

FIG. 24 shows an example of a PSF having an asymmetric shape at a marginal image height. An image including this PSF is acquired by an image sensor capable of image capturing with the pixel arrangements of R,G and B shown in FIGS. 22A-22C. FIG. 25 exemplifies the Restoration Gains set in consideration of the frequency bands of R, G and B for this case. FIG. 25 shows the Restoration Gains in a cross section cut along a white dotted line in FIG. 24, and a vertical axis in FIG. 25 shows values of the Restoration Gains.

Embodiment 5

Description will be made of an image restoration process as a fifth embodiment (Embodiment 5) of the present invention, the image restoration process being performed by an image processing apparatus such as a personal computer on a captured image acquired by a camera (image pickup apparatus) to which an interchangeable lens (image-taking optical system) is detachably attached.

The image processing apparatus includes a storage part (memory) to which an image processing program for causing the image processing apparatus to perform image processing is installed through a storage medium such as a CD or a DVD. The image processing apparatus includes a CPU that performs the image processing according to the image processing program.

In the above-mentioned storage medium in which the image processing program is stored, coefficient data necessary to produce the image restoration filters is also stored. When the program is installed in the image processing apparatus, the coefficient data is written from the storage medium to the storage part of the image processing apparatus.

The CPU of the image processing apparatus performs the image restoration process using the coefficient data and information for enabling specifying of an image sensor of the camera to produce an image restoration filter as two-dimensional data. Then, the CPU performs convolution of a captured image, which is a restoration target image, with the image restoration filter to produce a restored image.

On the other hand, the camera can receive, from the interchangeable lens, information on the interchangeable lens attached to the camera (identification information for identifying the interchangeable lens).

Moreover, in a memory of the camera, the above-mentioned information for enabling specifying the image sensor of the camera, such as information on a size of one pixel (pixel size) of the image sensor, is stored.

When communication between the camera and the image processing apparatus is started, the camera retrieves from its memory a captured image that becomes a restoration target image, the identification information of the interchangeable lens used when the captured image is acquired, and the information for enabling specifying the image sensor, and then sends them to the image processing apparatus. The information for enabling specifying the image sensor includes the above-described pixel size information, identification information of the camera, identification information of the image sensor, or the like.

In general, images acquired by cameras include information on an image pickup condition, which is represented by EXIF information, when image capturing is performed. The image pickup condition includes the ID (identification information) of the interchangeable lens, an F-number of the interchangeable lens, a focal length of the interchangeable lens, an object distance, and the like. Thus, the camera may send the captured image including the EXIF information to the image processing apparatus, instead of the above-described method.

The CPU of the image processing apparatus receives the captured image, the ID of the interchangeable lens and the information for enabling specifying the image sensor, and then retrieves, from the data prestored in the storage part, the coefficient data corresponding to the image pickup condition sent from the camera. The coefficient data corresponding to the image pickup condition may be coefficient data to be decided from a plurality of the image pickup conditions, or may be coefficient data to be decided from, for example, the ID of the interchangeable lens in the plurality of the image pickup conditions.

Then, the CPU of the image processing apparatus produces the image restoration filter by using the coefficient data and the information for enabling specifying the image sensor sent from the camera. Thereafter, the CPU of the image processing apparatus performs the image restoration process on the captured image with the produced image restoration filter. The coefficient data is data for producing the optical transfer function. Performing the Fourier transform on an inverse of the optical transfer function produced by using the coefficient data produces the image restoration filter.

As described above, this embodiment produces the image restoration filter by using the information for enabling specifying the image sensor and performs the image restoration process on the captured image by using the produced image restoration filter. This enables reduction of the negative effects caused due to the alias signal generated in the image sensor, thereby making it possible to produce a restored image with high image quality.

Embodiment 6

Description will be made of an image restoration process as a sixth embodiment (Embodiment 6) of the present invention, the image restoration process being performed by an image processing apparatus such as a personal computer on a captured image acquired by a camera (image pickup apparatus) provided integrally with an image-taking optical system.

The image processing apparatus includes a storage part (memory) to which an image processing program for causing the image processing apparatus to perform image processing is installed through a storage medium such as a CD or a DVD. The image processing apparatus includes a CPU that performs the image processing according to the image processing program.

In the above-mentioned storage medium in which the image processing program is stored, coefficient data necessary to produce the image restoration filters is also stored. When the program is installed in the image processing apparatus, the coefficient data is written from the storage medium to the storage part of the image processing apparatus. The CPU of the image processing apparatus produces, when performing the image restoration process, an image restoration filter as two-dimensional data by using the coefficient data. Then, the CPU performs convolution of a captured image, which is a restoration target image, with the image restoration filter to produce a restored image.

On the other hand, the camera stores ID (identification information) of the camera itself in its memory, and has a function of recording the ID to a captured image as EXIF information.

When communication between the camera and the image processing apparatus is started, the camera retrieves from its memory a captured image that becomes a restoration target image and the EXIF information including the ID of the camera, and sends them to the image processing apparatus.

The CPU of the image processing apparatus receives the captured image and the EXIF information, and retrieves from its storage part the coefficient data decided on the basis of EXIF information. And, the CPU of the image processing apparatus produces the image restoration filter by using the coefficient data and the ID of the camera, and then performs the image restoration process on the captured image with the produced image restoration filter.

As described above, this embodiment produces the image restoration filter by using the ID of the camera and performs the image restoration process on the captured image by using the produced image restoration filter. This enables reduction of the negative effects caused due to the alias signal generated in the image sensor, thereby making it possible to produce a restored image with high image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-191000, filed on Aug. 27, 2010, and 2011-172363, fild on Aug. 5, 2011 which are hereby incorporated by reference herein in their entirety.

What is claimed is:

1. An image processing apparatus comprising:
an image inputting part configured to acquire a captured image produced by an image pickup system including an optical system and an image sensor;
a filter producing part configured to produce an image restoration filter; and
a restoration processing part configured to perform an image restoration process on the captured image by using the image restoration filter to produce a restored image,
wherein the filter producing part is configured to generate an optical transfer function including an alias signal using an optical transfer function of the optical system and a sampling frequency of the image sensor and to set amplification factors for respective frequency components in the image restoration filter according to a frequency characteristic of the optical transfer function including the alias signal.

2. An image processing apparatus according to claim 1, wherein the filter producing part is configured to set the amplification factors for the respective frequency components in the image restoration filter in a frequency band up to a sampling frequency corresponding to pixel arrangement for a color component in the image sensor according to the frequency characteristic of the alias signal corresponding to the pixel arrangement of the color component, and configured to produce the image restoration filter in a frequency band up to a Nyquist frequency corresponding to the pixel arrangement in the image sensor.

3. An image processing apparatus according to claim 1, wherein the filter producing part is configured to set the amplification factor to be smaller for the frequency component in which a generation amount of the alias signal is larger.

4. An image processing apparatus according to claim 1, wherein the filter producing part produces the image restoration filter by using one of (a) a simulation result of an optical transfer function of the optical system or (b) an optical transfer function acquired by performing Fourier transform on a point spread function actually measured.

5. An image processing apparatus according to claim 1, wherein the filter producing part is configured to set the amplification factor based on a ratio of a frequency characteristic, not including the alias signal, of a modulation transfer function of the image pickup system and a frequency characteristic of the alias signal.

6. An image pickup apparatus comprising:
an image pickup system including an optical system and an image sensor; and
an image processing apparatus, wherein the image processing apparatus comprises:
an image inputting part configured to acquire a captured image produced by an image pickup system including an optical system and an image sensor;
a filter producing part configured to produce an image restoration filter; and
a restoration processing part configured to perform an image restoration process on the captured image by using the image restoration filter to produce a restored image,
wherein the filter producing part is configured to generate an optical transfer function including an alias signal using an optical transfer function of the optical system and a sampling frequency of the image sensor and to set amplification factors for respective frequency components in the image restoration filter according to a frequency characteristic of the optical transfer function including the alias signal.

7. An image processing method comprising:
an image acquiring step of acquiring a captured image produced by an image pickup system including an optical system and an image sensor;
a filter producing step of producing an image restoration filter; and a restoring step of performing an image restoration process on the captured image by using the image restoration filter to produce a restored image, wherein, in the filter producing step, amplification factors for respective frequency components in the image restoration filter are set according to a frequency characteristic of an optical transfer function including an alias signal, and wherein the optical transfer function including the alias signal is generated using an optical transfer function of the optical system and a sampling frequency of the image sensor.

8. A non-transitory computer-readable storage medium storing an image processing program executable by a computer to execute an image processing method comprising:

an image acquiring step of causing the computer to acquire a captured image produced by an image pickup system including an optical system and an image sensor;

a filter producing step of causing the computer to produce an image restoration filter; and a restoring step of causing the computer to perform an image restoration process on the captured image by using the image restoration filter to produce a restored image, wherein the filter producing step includes:

a generating step of generating an optical transfer function including an alias signal using an optical transfer function of the optical system and a sampling frequency of the image sensor, and a setting step of setting amplification factors for respective frequency components in the image restoration filter according to a frequency characteristic of the optical transfer function including the alias signal.

* * * * *